US 12,203,800 B2

United States Patent
Meier et al.

(10) Patent No.: US 12,203,800 B2
(45) Date of Patent: Jan. 21, 2025

(54) SYSTEM AND METHOD FOR MEASURING GRAIN CART WEIGHT

(71) Applicant: Bitstrata Systems Inc., Saskatoon (CA)

(72) Inventors: Ian Robert Meier, Saskatoon (CA); Michael David Lockerbie, Saskatoon (CA)

(73) Assignee: Bitstrata Systems Inc., Saskatoon (CA)

(*) Notice: Subject to any disclaimer, the term of this patent is extended or adjusted under 35 U.S.C. 154(b) by 983 days.

(21) Appl. No.: 17/201,288

(22) Filed: Mar. 15, 2021

(65) Prior Publication Data

US 2021/0255027 A1 Aug. 19, 2021

Related U.S. Application Data

(63) Continuation of application No. 16/728,593, filed on Dec. 27, 2019, now Pat. No. 10,976,190, which is a (Continued)

(51) Int. Cl.
*G01G 13/24* (2006.01)
*G01G 13/00* (2006.01)
(Continued)

(52) U.S. Cl.
CPC ............ *G01G 13/24* (2013.01); *G01G 13/00* (2013.01); *G01G 13/006* (2013.01); *G01G 13/28* (2013.01);
(Continued)

(58) Field of Classification Search
CPC ...... G01G 13/24; G01G 13/00; G01G 13/006; G01G 13/28; G01G 15/00; G01G 19/00;
(Continued)

(56) References Cited

U.S. PATENT DOCUMENTS 3,661,220 A * 5/1972 Harris .................. G01G 3/1406
177/136
4,455,096 A 6/1984 Brandstedt
(Continued)

FOREIGN PATENT DOCUMENTS

CA 2084882 A1 12/1991
CA 2251116 A1 10/1997
(Continued)

OTHER PUBLICATIONS

Bellini et al., 'Advances in Diagnostic Techniques for Induction Machine', Dec. 2008, IEEE Publication, vol. 55, No. 12, pp. 4109-4126 (Year: 2008).*
(Continued)

*Primary Examiner* — Elias Desta
(74) *Attorney, Agent, or Firm* — Lempia Summerfield Katz LLC

(57) ABSTRACT

A system of detecting loading and unloading of mobile containers such as grain carts utilizes two low pass filters to determine whether the contents of the container are changing by subtracting one filter signal from the other, and using the sign of the difference. Weighing performance is improved by utilizing accelerometers to compensate for measurement dynamics and non-level orientation. Failure and degradation of weight sensors is detected by testing sensor half bridges. Loading and unloading weights can be tied to specific vehicles by utilizing RF beacons.

20 Claims, 10 Drawing Sheets

Related U.S. Application Data continuation of application No. 15/961,215, filed on Apr. 24, 2018, now Pat. No. 10,545,046, which is a continuation of application No. 14/542,572, filed on Nov. 15, 2014, now Pat. No. 9,983,048.

(60) Provisional application No. 61/904,564, filed on Nov. 15, 2013.

(51) Int. Cl.
<table>
<tr><td>G01G 13/28</td><td>(2006.01)</td></tr>
<tr><td>G01G 15/00</td><td>(2006.01)</td></tr>
<tr><td>G01G 19/00</td><td>(2006.01)</td></tr>
<tr><td>G01G 19/08</td><td>(2006.01)</td></tr>
<tr><td>G01G 19/12</td><td>(2006.01)</td></tr>
<tr><td>G01G 23/10</td><td>(2006.01)</td></tr>
<tr><td>G01G 23/18</td><td>(2006.01)</td></tr>
</table>

(52) U.S. Cl.
CPC ............ *G01G 15/00* (2013.01); *G01G 19/00* (2013.01); *G01G 19/08* (2013.01); *G01G 19/12* (2013.01); *G01G 23/10* (2013.01); *G01G 23/18* (2013.01)

(58) Field of Classification Search
CPC ........ G01G 19/08; G01G 19/12; G01G 23/10; G01G 23/18
See application file for complete search history.

(56) References Cited

U.S. PATENT DOCUMENTS

| | | | |
|---|---|---|---|
| 5,837,945 | A | 11/1998 | Cornwell et al. |
| 5,870,689 | A | 2/1999 | Hale et al. |
| 6,124,647 | A | 9/2000 | Marcus et al. |
| 6,529,164 | B1 | 3/2003 | Carter |
| 7,038,584 | B2 | 5/2006 | Carter |
| 7,312,752 | B2 | 12/2007 | Smith et al. |
| 7,830,250 | B2 | 11/2010 | Huseth |
| 8,823,577 | B2 | 9/2014 | Smid et al. |
| 9,983,048 | B1 | 5/2018 | Meier |
| 10,545,046 | B2 | 1/2020 | Meier |
| 2001/0045733 | A1 | 11/2001 | Stanley |
| 2002/0059075 | A1* | 5/2002 | Schick ............... G06Q 10/06 705/305 |
| 2003/0109993 | A1 | 6/2003 | Peat |
| 2003/0122669 | A1 | 7/2003 | Filippov |
| 2005/0166673 | A1 | 8/2005 | Kimbara et al. |
| 2007/0088481 | A1 | 4/2007 | Mccormick |
| 2007/0159178 | A1 | 7/2007 | Stanley |
| 2009/0325658 | A1 | 12/2009 | Phelan et al. |
| 2012/0253611 | A1 | 10/2012 | Zielke et al. |
| 2013/0317696 | A1 | 11/2013 | Koch |
| 2014/0060939 | A1 | 3/2014 | Eppert |
| 2014/0195256 | A1 | 7/2014 | Wagner et al. |
| 2016/0116328 | A1 | 4/2016 | Kivi |
| 2016/0239023 | A1 | 8/2016 | Rylander |

FOREIGN PATENT DOCUMENTS

| | | |
|---|---|---|
| CN | 101634586 A | 1/2010 |
| CN | 203630655 U | 6/2014 |
| DE | 102011002884 A1 | 12/2011 |
| EP | 2261613 A1 | 12/2010 |
| EP | 2511678 A1 | 10/2012 |
| WO | 2015057638 A1 | 4/2015 |

OTHER PUBLICATIONS

International Search Report and Written Opinion of the International Searching Authority in International Patent Application No. PCT/CA2014/000810, dated Aug. 7, 2015, 20 pages.

* cited by examiner

DIAGNOSTIC CIRCUITRY ON HALF BRIDGE

FULL WEIGHBRIDGE

SYSTEM AND METHOD FOR MEASURING GRAIN CART WEIGHT

REFERENCE TO RELATED APPLICATIONS

This application is a continuation under 37 C.F.R. § 1.53(b) of U.S. patent application Ser. No. 16/728,593 filed Dec. 27, 2019, which is a continuation of U.S. patent application Ser. No. 15/961,215 filed Apr. 24, 2018, now U.S. Pat. No. 10,545,046, which is a continuation of U.S. patent application Ser. No. 14/542,572 filed Nov. 15, 2014, now U.S. Pat. No. 9,983,048, which claims the benefit of the filing date under 35 U.S.C. § 119(e) of U.S. Provisional Application Ser. No. 61/904,564, filed Nov. 15, 2013, the entire disclosures of which are incorporated by reference in their entirety.

FIELD OF THE INVENTION

The present invention relates to weighing dynamic loads and, more specifically, to apparatus and method for weighing grain cart loads.

BACKGROUND

FIGS. 1A and 1B are drawings that show a combine 20 loading grain 22 from a field of grain 23 into a grain cart 10. FIG. 2 is a drawing showing a grain cart 10 with a grain truck 24. Grain carts 10 are large-capacity pull-type trailers with a container 12 for grain 22, a built-in discharge auger 18, and capacities currently as high as 2,000 bushels. A tractor 13 with grain cart 10 typically shuttles grain 22 from a combine 20 in a field to a grain truck 24 located at the edge of the field. The grain carts 10 are typically loaded by or from a combine 20, and then unloaded into a truck 24, with combines 20 and trucks 24 typically utilized with one or more grain carts 10 to harvest fields of grain. The use of grain carts dramatically increases harvest efficiency, allowing combines 20 to operate nearly continuously with no need to stop to unload, especially since grain carts 10 can be loaded from combines 20 while the combines and the grain cart they are loading move across the field together in a synchronized manner. While the grain cart 10 is away from the combine 20, the combine may continue to harvest the field, relying on its built-in hopper or grain container to buffer the harvested grain. After unloading to a waiting truck 24, the grain cart 10 can then head back to receive grain from a (not necessarily the same) combine 20.

Early adopters experimented with cart-based weighing systems, which quickly became standard equipment currently on roughly 80% of grain carts built in-factory. Weighing systems for grain carts allow the tracking of yields, and help ensure that operators can accurately fill the truck to capacity with little risk of incurring fines for overweight loads. Grain carts make the use of combines more efficient; weighing systems can help make the whole process more efficient.

Grain cart weighing systems currently comprise two parts: weight sensors, and electronics that weigh the load and present information to the user—often called "indicators". Currently, weight sensors are typically either load cells or weigh bars. Typically, a plurality of weight sensors is utilized for each cart. In one typical configuration, there is one weight sensor for each wheel and one for the tow bar or hitch. In another typical configuration, there is a plurality of weight sensors spread out around the grain cart container. Systems offered by market incumbents provide a monolithic measurement and display terminal typically situated in the tractor's cab with wires that connect back to the grain cart weight sensors, which may have been combined through a passive junction box. In their simplest form, standard weigh scale functions are provided including: zero; tare; and net/gross toggle. Advanced systems provide grain management functions allowing harvesting details to be captured as transactions.

However, while conventional methods and technologies have gained significant market acceptance, it has been noted that there are numerous issues with the current state of the art. Some of the recognized problems are as follows:

Measurement Dynamics. While on-board weighing systems can generally provide accurate static measurements on level ground, weight measurements can be compromised by forces that originate either on-cart (auger operation) or from accelerations due to drops and impacts with obstacles on uneven terrain. The degree of measurement contamination relates to the specific terrain, cart resonances, and vehicle velocity—higher speeds having a more significant adverse impact on accuracy. FIG. 3 is a graph that illustrates the measurement dynamics that may be experienced while traversing a rough field, which contaminate the accuracy of the measured payload weight. This chart is an example of how measured weight can bounce around as a grain cart moves across a field. Weight sensors measure force, which relates to mass and any applied accelerations including that of gravity and those of vehicle dynamics encountered when a cart traverses uneven ground. When a bump results in an upward acceleration the weight sensors see an increased force, and when downward, a decreased force. This is true even if it were possible to maintain the alignment of the weight sensor toward the center of the earth. Even while stopped, uneven ground can result in inaccurate weight measurement, since the axis of sensitivity of the weighing sensor becomes misaligned with the gravity vector. This typically results in only a fraction of the load being measured by the weighing sensor, since the acceleration or force vector is no longer in just the direction of the axis of sensitivity of the weight sensor, but may include components in other directions.

Transaction Logging. While entry-level indicators provide basic weighing functionality, full-featured systems allow capture of weight transfer data (transactions) from cart to truck. Some offer automatic unload detection to ensure that harvest data is complete and not subject to potential operator error due to the monotony and exhaustion suffered by cart operators.

Generally, unloading the cart (loading the truck) is done while stopped or at very low speeds, so dynamics are kept to a minimum allowing high-quality measurement; however, often the critical start and stop phases involve rapid cart acceleration or deceleration to and from the combine for purposes of time efficiency; this usually results in vibrations seen by the weight sensors. This is also true for the loading process. Such dynamics, and those experienced when shuttling across rough terrain, make the ostensibly simple process of automatically recording the weights when they start and stop changing during an unloading or loading process much more difficult. In fact, the process is sufficiently difficult that some manufacturers avoid monitoring weight for this purpose altogether, and instead monitor the equipment that drives the grain transfer auger in order to gate the unloading process; this of course does not help in determination of the loading process. Prior to the present invention, there was no system or methodology available that accurately determined the starting and stopping of loading and/or unloading of such carts in real-world environments without the use of additional sensors to monitor the grain transfer equipment.

Operations Tracking. Lack of identification of the harvesting equipment (combine and truck) involved in grain transactions limits the usefulness of the collected management information. Although a grain cart operator could record such information manually, operator error due to the monotony and exhaustion suffered by cart operators leaves manually collected data unreliable.

No telemetric operational coordination currently exists between grain cart and combine. The efficiency of harvest operations could be increased through reception (or prediction) of combine fill-level and location for display to the grain cart operator.

Pre-emptive Weigh Bridge Failure Detection. Quality on-cart grain weighing is predicated on having functional weight sensors, such as weigh bars. Over time, these devices can fail by delamination of the internal strain gauges, vibrational stresses harming internal wiring, or by physical damage to the bar or external wiring. The damage can occur slowly or abruptly depending on the failure mode, but in all cases ultimately affects the weighing performance. The operator may misdiagnose slow or even the catastrophic failures, and compensate for resulting measurement drifts or offsets by re-zeroing the scale indicator. Such remedies can result in weight inaccuracies and erroneous farm management data. If pre-emptively and properly diagnosed, defective sensors and wiring can be replaced before they impact production. However, there is no automated system or methodology available to detect and isolate this problem.

Display Location Diversity. Although a scale display terminal is useful in both the loading (from combine) and unloading (to truck) phases, a single display cannot be positioned so that it may be viewed practically in both phases because the operator faces in opposing directions due to the relative locations of combine and truck during loading and unloading. Currently, either two displays are required, which is complicated and costly, or the operator must split his attention between the display and the grain transfer itself, which is error prone and inefficient.

What is needed, therefore, is a method or methods that can address the above identified problems in the current state of the art.

BRIEF SUMMARY OF THE INVENTION

This patent discloses and claims a useful, novel, and unobvious invention for improved weighing and related operational and data management functionality in the farm vehicle field.

According to a first aspect of the present invention, weight and simultaneous three-axis accelerometer measurements are used to compensate for at least some of the effect of non-level or rough terrain.

According to a second aspect of the present invention, a method automatically detects weights of grain transactions by differencing the weight signal as processed by two parallel low pass filters, each with different pass characteristics.

According to a third aspect of the present invention, a method of equipment usage tracking involves the use of beacons and signal strength detection as an indicator of proximity and therefore equipment identification.

According to a fourth aspect of the present invention, a method for estimating a combine's current fill level involves tracking combine performance using load weight per unit time and per unit area harvested.

According to a fifth aspect of the present invention, a method is presented for electrically testing weigh bars installed on a grain cart.

According to a sixth aspect of the present invention, a method for enhancing display location diversity involves automatically reversing the displayed image when unloading, and reflecting and restoring the image using a mirror located conveniently for the operator.

A detailed description of exemplary embodiments of the present invention is given in the following. It is to be understood, however, that the invention is not to be construed as being limited to these embodiments.

BRIEF DESCRIPTION OF THE DRAWINGS

FIG. 9A shows the tablet normally, and FIG. 9B shows the tablet reversed.

DETAILED DESCRIPTION

Figure 4:
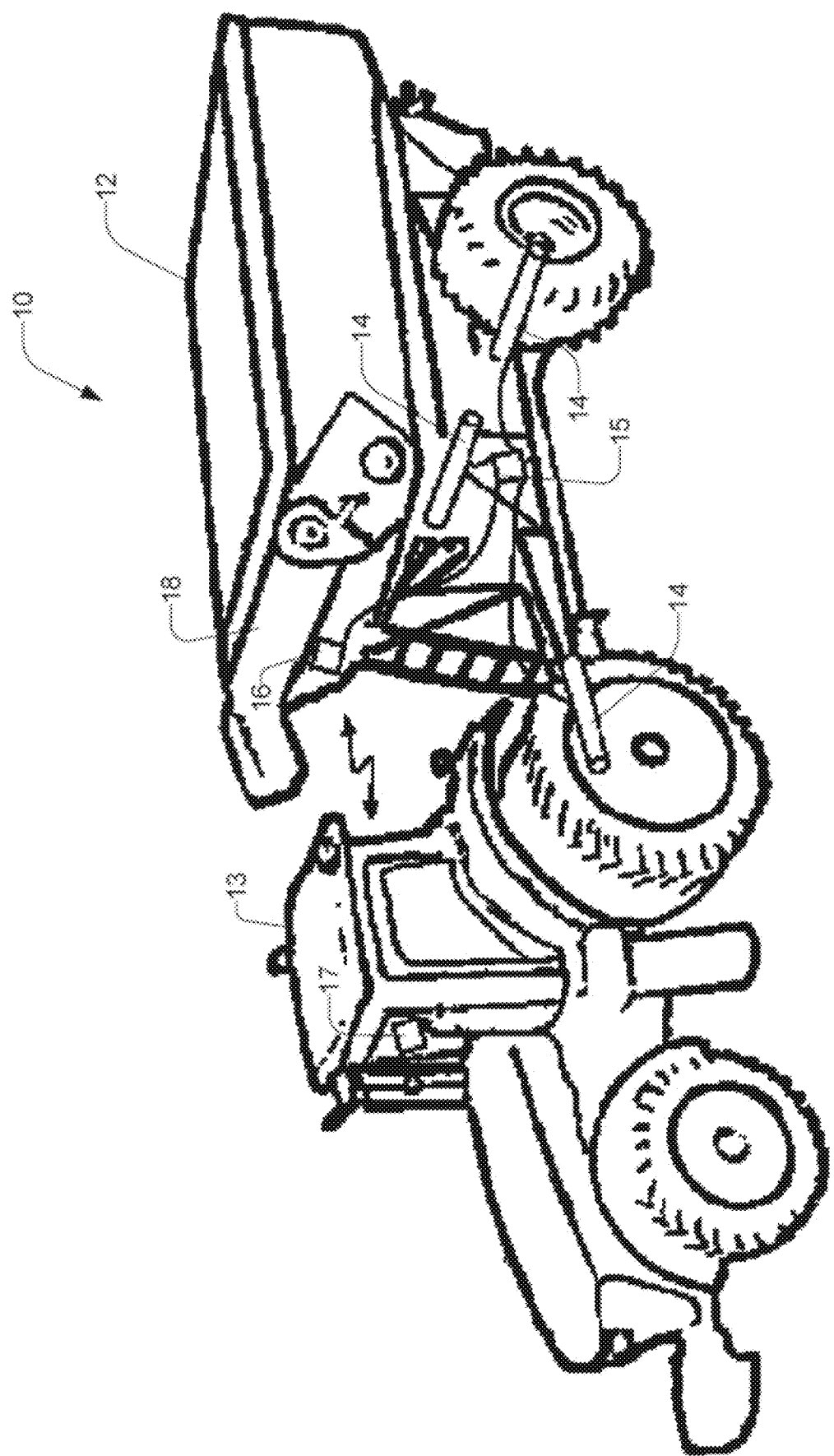
FIG. 4 is a drawing showing a grain cart 10 with weight sensors 14 installed, in accordance with an exemplary embodiment of the present invention.

The present invention differs from solutions offered by others as it does not have a monolithic topology, but instead uses a mobile device as the display terminal, user interface, and processing engine, and which connects wirelessly to electronics located on a grain cart. The signals from weight sensors are combined through use of a junction box; the resulting signal is then forwarded to the electronics for measurement, conversion, and transmission to the mobile device. Leveraging mobile devices in the present invention reduces product cost, increases processing capacity, and provides advanced data connectivity and navigational capabilities, while enhancing customer familiarity and thus market acceptance. This topology is shown in FIG. 4.

Exemplary embodiments of the present invention will now be described with reference to the appended drawings.

Measurement Dynamics. Exemplary embodiments of the present invention can include techniques to assist with achieving improved weight and mass measurements as described below, using accelerometer-compensated mass measurement.

Effects of non-level orientation and in-motion vibration can be reduced from mass measurements by compensating weight measurements with simultaneous accelerometer measurements, given matching bandwidths. One exemplary embodiment uses STmicroelectronics LIS3DH three-axis accelerometer integrated circuits as part of a printed circuit board, with one three-axis accelerometer mounted preferably near each of the weight sensors.

FIG. 4 is a drawing showing a grain cart 10 with weight sensors 14 installed, in accordance with an exemplary embodiment of the present invention. The signals from each of the weight sensors are received by interface electronics with on-board three-axis accelerometer 16. The interface electronics 16 perform signal measurement, conversion, and transmission of the signals to a mobile device that may be located in the tractor 13 towing the grain cart 10. In one embodiment of the present invention, Bluetooth Low Energy (BLE) is utilized to transmit the signals wirelessly. Other transmission means are also within the scope of the present invention. In one embodiment of the present invention, the mobile device 17 receiving the signals is a tablet, such as an iPad. Other mobile devices 17 are also within the scope of the present invention. Moreover, while the device 17 typically utilized in the cab of the tractor 13 is mobile, it can also be permanently installed. Moreover, it can relay the information received, and the results of calculations and computations performed to other devices wirelessly or with a wired connection at a future time, for example, at the end of the work day.

Newton's law of motion is applied as follows in a preferred embodiment:

$$F = m * a \quad (1)$$

where "m" is the total mass of payload and carrier; "F" is the total instantaneous force of the payload and carrier weights as seen by the weight sensors; and "a" is the instantaneous acceleration projected along the axis of measurement of the weight sensors Two exemplary methods are shown below sharing various commonalities. Common to both exemplary methods are sensor mounting, determination of reference gravity vector, and projection of the instantaneous acceleration measurements along the reference gravity vector.

Sensor Mounting: Sensors are to be mounted as follows in the exemplary methods:
(1) Mount each single-axis weight sensor so that it is most sensitive in the downward direction (toward the center of the Earth) while the cart is stationary and on level ground. Other configurations are also within the scope of the present invention. However, this configuration is preferred, since it easily allows a reference acceleration vector that aligns with the axis of sensitivity of the weighing sensors to be recorded when stopped on level ground.
(2) Mount one or more three-axis accelerometers in a convenient orientation on the cart. In a preferred embodiment, one accelerometer is mounted coincident with each weight sensor, and a correction is preferably performed on the data from each weight and accelerometer sensor pair. Other configurations are also within the scope of the present invention.

Determination of Reference Gravity Vector: Measure and record a vector of the static acceleration due to gravity while stationary and on level ground.

Projection of Accelerations along the axis of measurement of the weight sensors: Accelerations projected along the axis of measurement of the weight sensor(s) (a) can be determined by performing the scalar product (dot product) of the measured acceleration and the reference gravity vector, which aligns with the axis of measurement of the weight sensors due to the mounting method described above, and then dividing by the magnitude of the reference gravity vector.

In the first exemplary method, Equation 1 can be rearranged to yield mass as follows:

$$m = F/a \quad (2)$$

The total force (F) is measured with respect to the weight offset (the measured value seen under free fall). The weight offset occurs at the point of zero acceleration, and represents offsets in the measurement apparatus including those of the weigh bars, amplifiers, and data converters. The total force (F) can thus be expanded to reflect the raw measured force ($F_{MEAS}$) and weight offset (k) as follows:

$$m = (F_{MEAS} - k)/a \quad (3)$$

While it is impractical to measure the weight offset directly, a method is disclosed to find it as follows:
1) While traveling with constant mass over rough terrain, record weight ($F_{MEAS}$) and acceleration data pairs.
2) Compute the projections of the acceleration data on the axis of measurement of the weight sensors.
3) Estimate the weight offset (k) by computing the y-intercept of the least-squares line estimate of weight ($F_{MEAS}$) and projected accelerations (see FIG. 5).

Figure 1A:
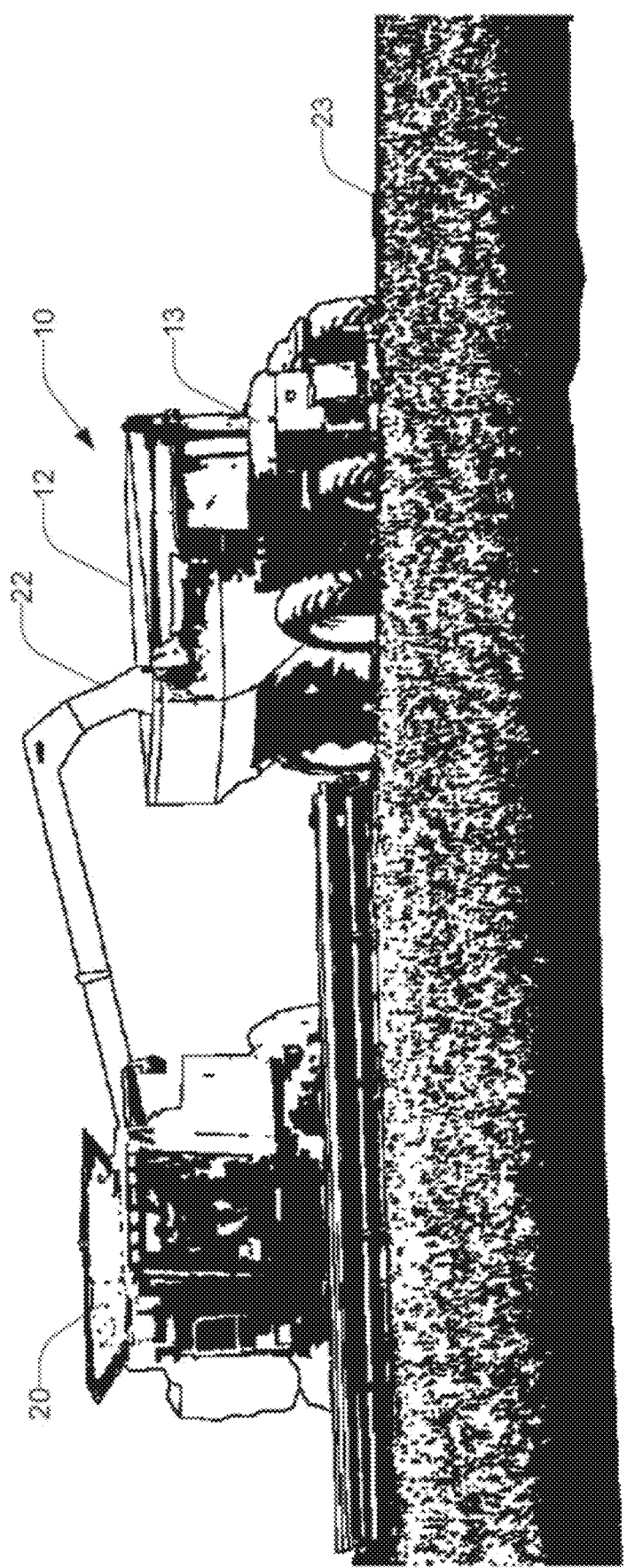
FIGS. 1A and 1B are drawings that show a combine 20 loading grain 22 into a grain cart 10.
Figure 1B:
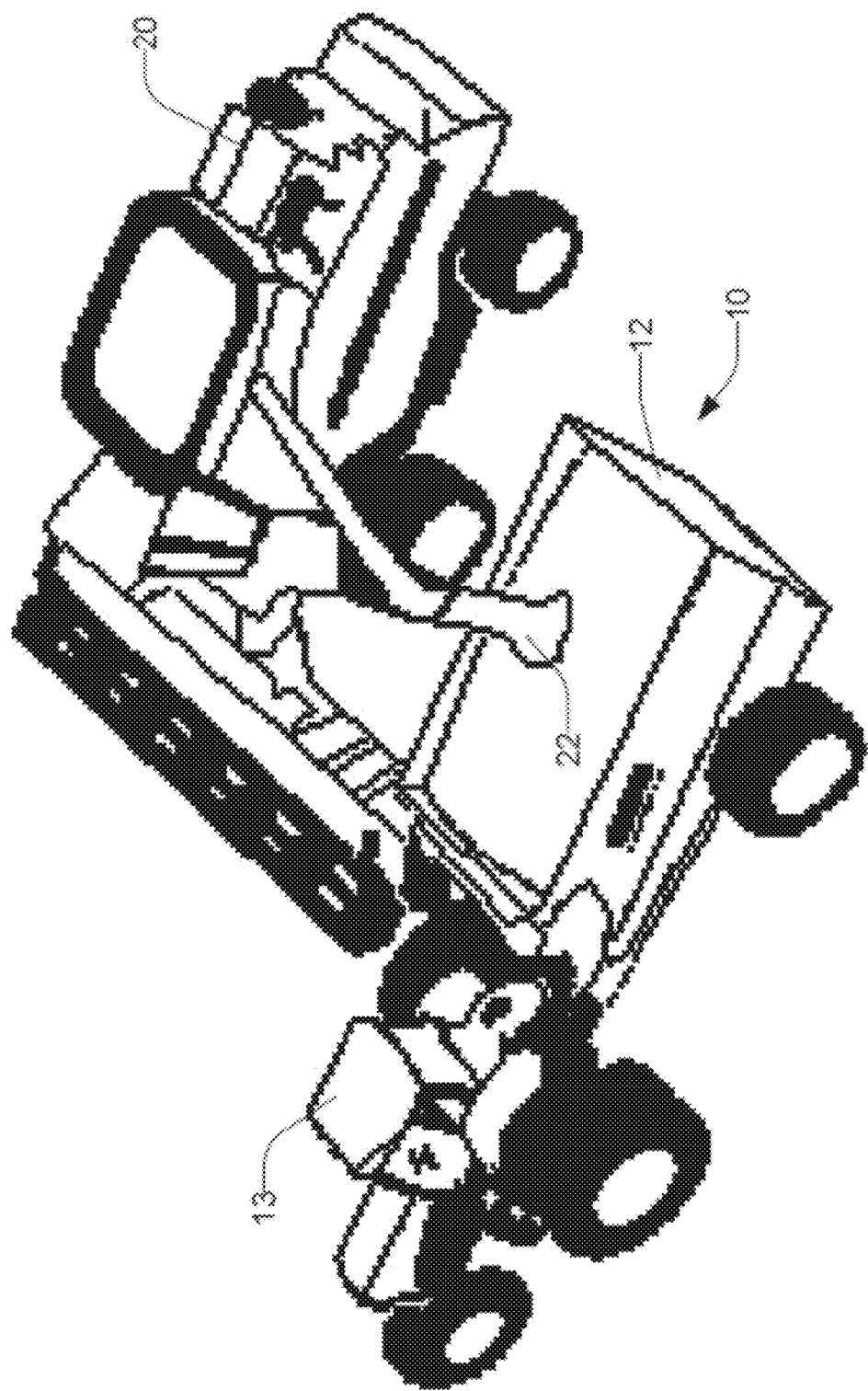
Figure 2:
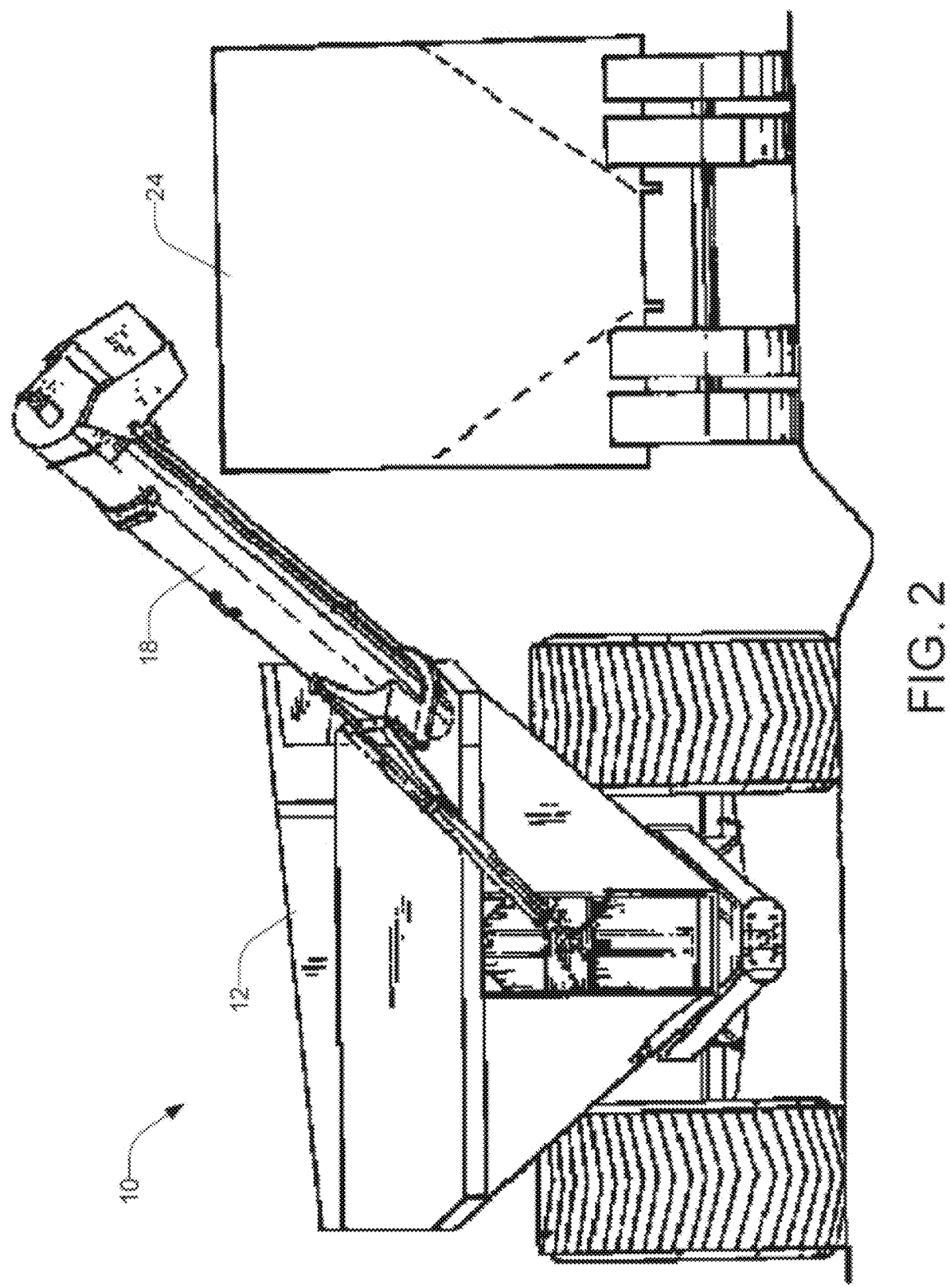
FIG. 2 is a drawing showing a grain cart 10 with a grain truck 24.
Figure 3:
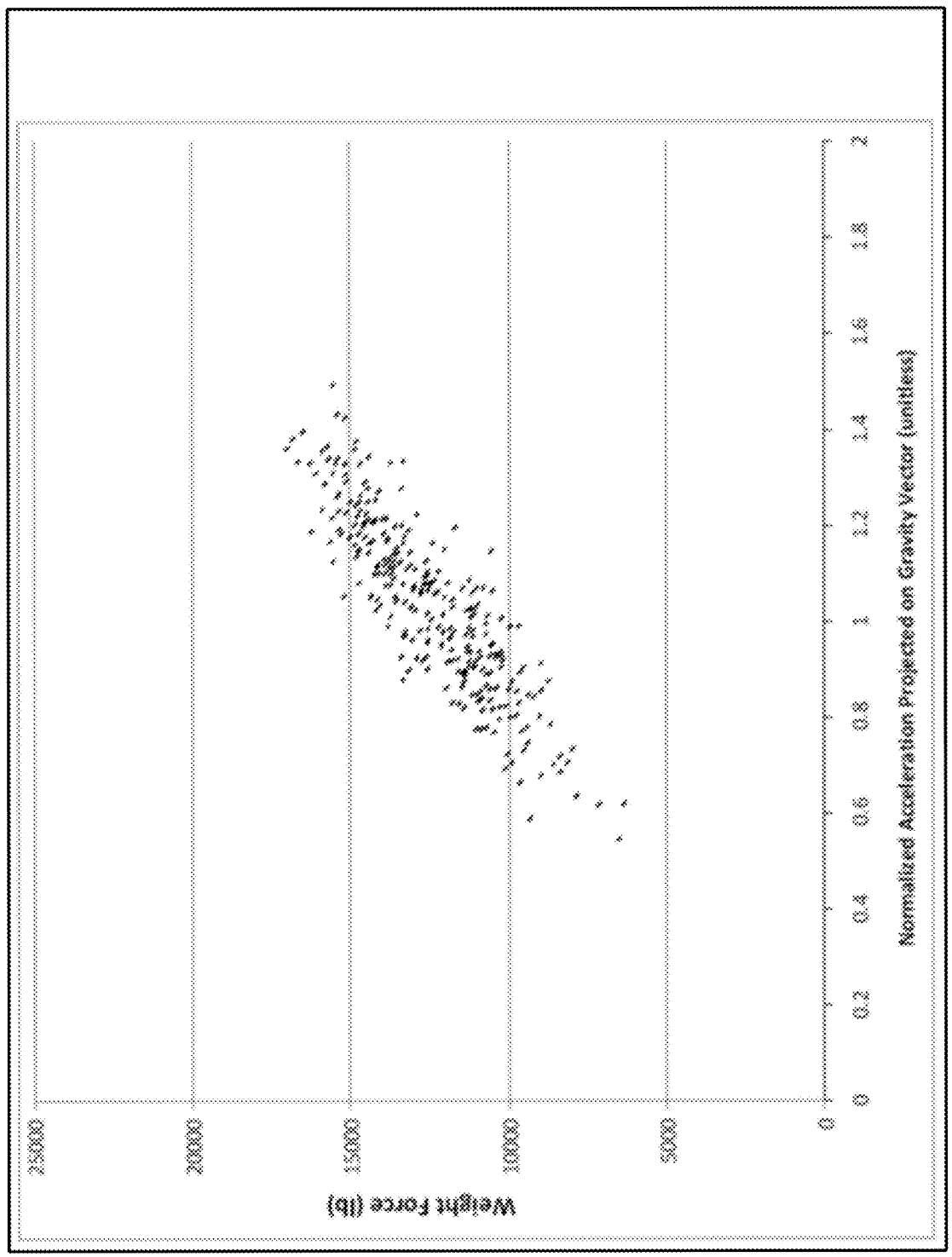
FIG. 3 is a graph that illustrates the measurement dynamics that may be experienced while traversing a rough field.
Figure 5:
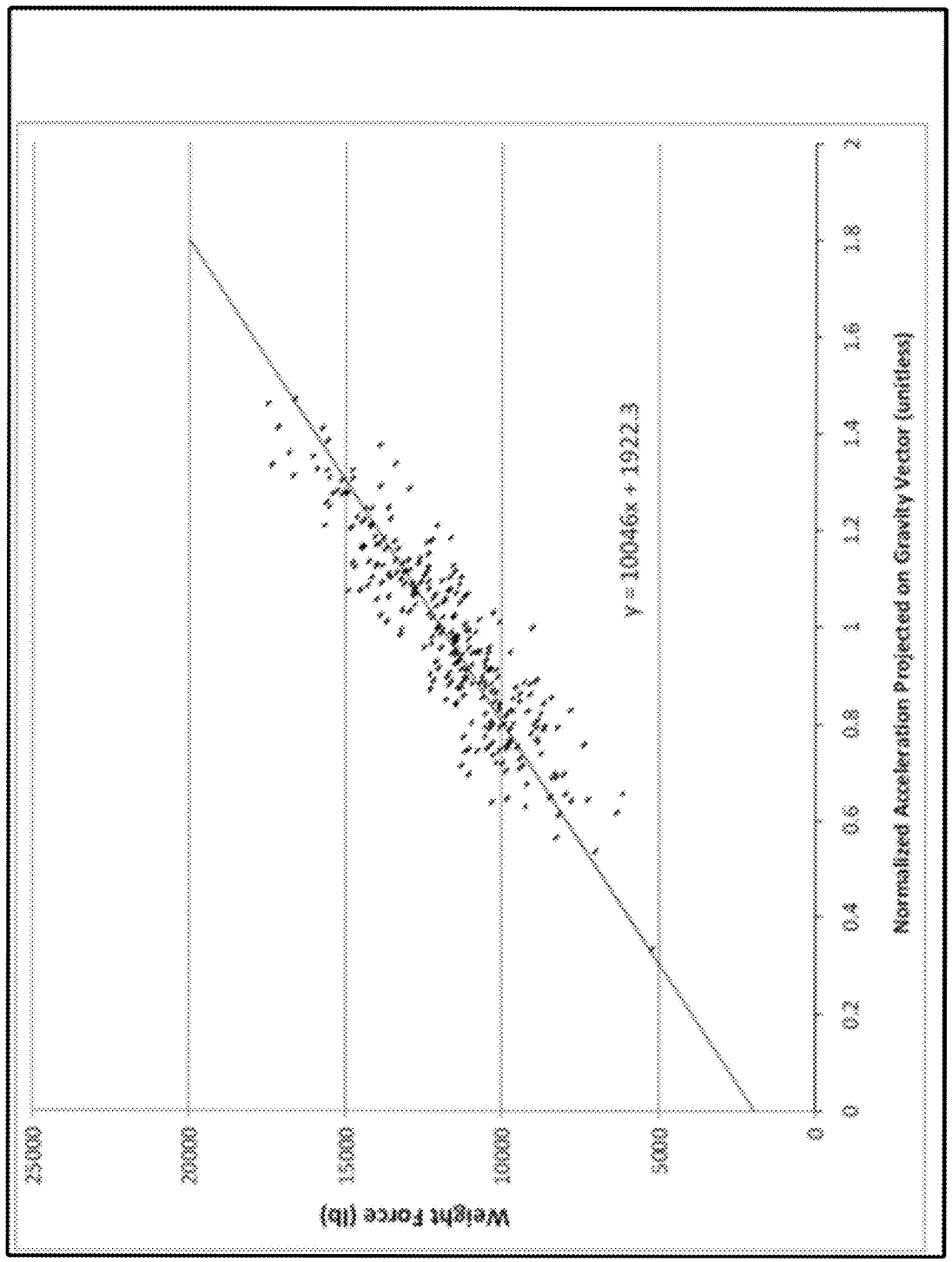
FIG. 5 is a drawing similar to the drawing shown in FIG. 3, with a line fit to the data points utilizing least-squares.

FIG. 5 is a drawing similar to the drawing shown in FIG. 3, with a line fit to the data points utilizing least-squares. Once the weight offset (k) is known, the total mass (or weight under constant and known acceleration) can be determined by the following:
1) Measure the instantaneous weight ($F_{MEAS}$) and acceleration (a) data pair.
2) Compute the projection of the acceleration on the axis of measurement of the weight sensors.
3) Compute the total mass (m) using equation 3.

A second method requires no regression. Instead, two weight ($F_{MEAS}$) and acceleration (a) data pairs can be measured while traveling with constant mass, and the accelerations projected along the axis of measurement of the weight sensors (a). This provides two simultaneous equations and two unknowns based on Equation 3, thus allowing a solution for constant "k" using linear algebra techniques as follows:

$$k = (F_{MEAS1} * a_2 - F_{MEAS2} * a_1)/(a_2 - a_1) \quad (4)$$

The weight offset (k) that is determined can be low-pass filtered over subsequent measurements to reduce the noise bandwidth. The filter's corner frequency can be set quite low, since "k" does not vary while mass is constant. By applying techniques to automatically determine when the mass is changing, as discussed in subsequent sections, the input data may be gated to ensure that the mass remains constant. Once the weight offset (k) has been determined to be sufficiently well characterized (it no longer changes significantly), the total mass (or weight under constant and known acceleration) can be determined using Equation 3.

With either exemplary method, the bandwidths of the weight and acceleration sensors should preferably be matched and the sampling time should be synchronized. In the exemplary embodiment, evaluation of the above equations is performed within a processor of the electronics in order to coordinate the measurements and reduce the needed radio bandwidth. The compensated measurements may then be forwarded to the mobile device in the tractor cab.

Automatic Transaction Detection. Exemplary embodiments of the present invention can include a technique to automatically detect weights of grain transactions (cart loads and unloads). It differences the weight signal as processed by two parallel low pass filters, each with different pass characteristics—one high bandwidth, one low bandwidth. The high bandwidth path improves signal to noise ratio by limiting bandwidth while impacting delay minimally. The low bandwidth path further improves signal to noise ratio while adding significant delay.

Figure 6:
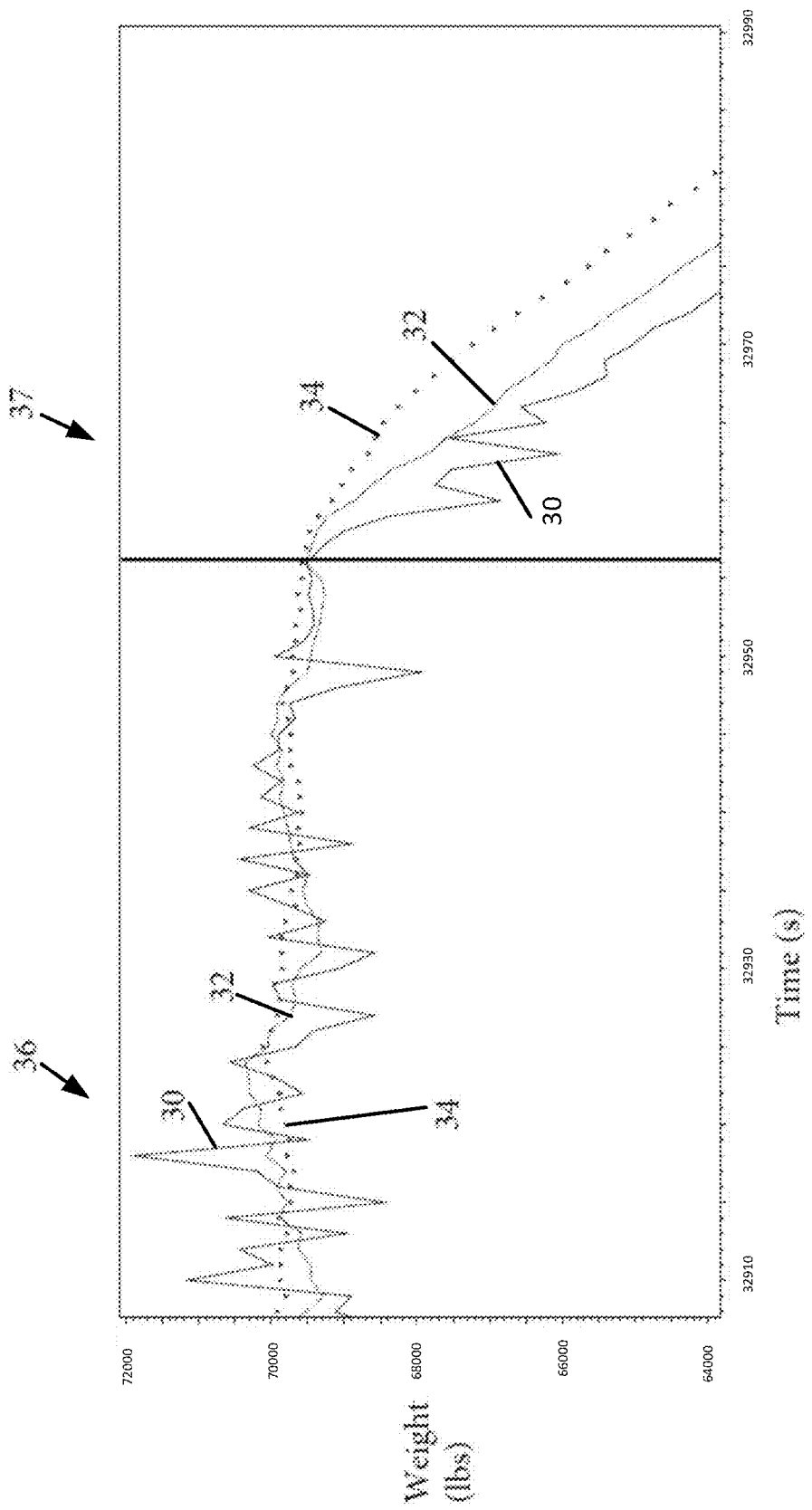
FIG. 6 is a graph that shows the original and filtered signals at the transition into an unload event.

FIG. 6 is a graph that shows the original signal 30 and the high bandwidth 32 and low bandwidth 34 filtered signals at the transition between the regions of constant mass 36 and constant unloading 37 for an unload event.

Figure 7:
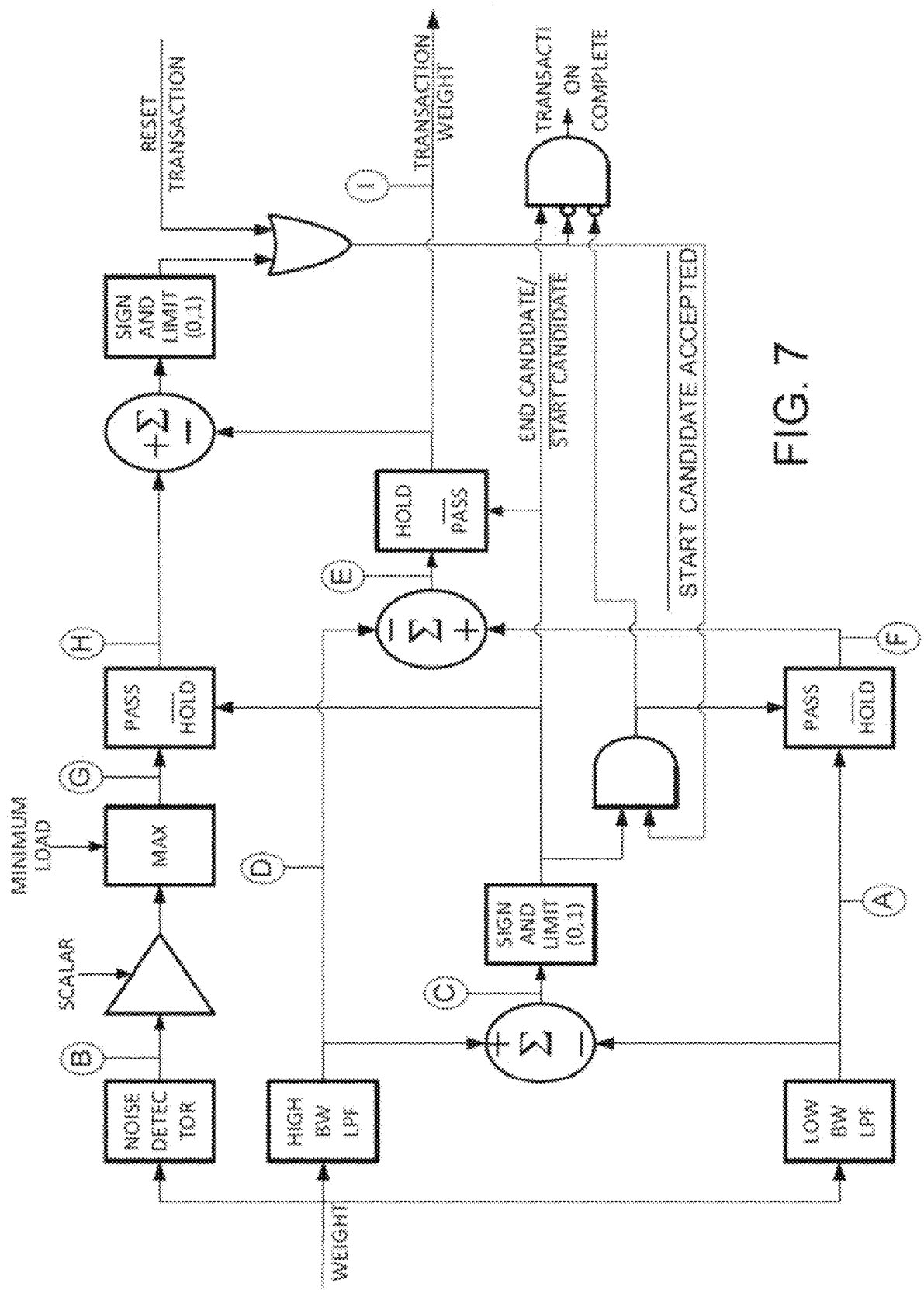
FIG. 7 is a drawing that shows an exemplary signal chain of the "unloading" detection process, in accordance with one embodiment of the present invention.

FIG. 7 is a drawing that shows an exemplary signal chain of the "unloading" detection process, in accordance with one embodiment of the present invention. The "loading" detection process is similar with opposite threshold and hold polarities.

During periods of constant weight (neither loading nor unloading), on average, the difference (C) of high (D) and low (A) bandwidth signals remains zero with frequent toggles between positive and negative. However, in the case of continuous loading or unloading, the filter delay between the two paths causes the difference signal to be predominantly or even entirely of one sign—in this embodiment positive (loading), or negative (unloading). The signal is nominally the difference in filter delay multiplied by the rate of loading or unloading. By using filters with a linear phase response, as can designed by a person of ordinary skill in the art using finite impulse response (FIR) techniques, the associated filter delays are fixed and known, as is the delay between filters. The "difference" signal remains entirely positive (in this embodiment) when loading is sufficiently fast (or negative if unloading), or the noise is sufficiently low. This exemplary embodiment uses moving average filters of length 16 and 7 for the low and high bandwidth filters, and a sample rate of one (1) Hz. Other filter designs and configurations are also within the scope of the present invention.

A measurement is performed to determine the instantaneous noise level (B) of the weight signal; the exemplary method computes the standard deviation over a moving window of, for example, length 7. A noise threshold (G) is dynamically computed as the greater of the MINIMUM_LOAD parameter (1000 lb typical of the exemplary method) and the product of the noise measurement and a fixed scalar constant, such as six (6) as used in the exemplary method.

The exemplary method latches and holds a start noise threshold (H) from the noise threshold (G) each time difference signal (C) goes negative (weight begins to fall). It also then latches and holds a candidate start weight (F) from the low bandwidth filter (A) provided that START_CANDIDATE_ACCEPTED is not yet true. While difference signal (C) remains low (unloading), the transactional weight difference (E) between the high bandwidth signal (D) and the candidate start weight (F) may pass a gate for comparison with the start noise threshold (H). If the transactional weight (E) exceeds the threshold (H) while point C remains low, the candidate start weight (F) is accepted and held for the remainder of the transaction (START_CANDIDATE_ACCEPTED becomes true). If, instead, difference signal (C) goes positive before the threshold is exceeded, the candidate start weight hold is released and the system resumes searching for a candidate start weight. Note that whenever difference signal (C) goes positive the start noise threshold hold is released, and the current noise threshold then passes. Once accepted, the transactional weight (E) continues to rise until difference signal (C) goes positive (weight stops falling), at which point the transactional weight is latched (I) and compared with the current noise threshold subject to the MINIMUM_LOAD parameter. If the latched weight exceeds the threshold, the TRANSACTION_COMPLETE flag is set, and the system may be then readied for subsequent transactions when the RESET_TRANSACTION line is pulsed high, which relinquishes control of the capturing of candidate start weights back to difference signal (C). If the weight falls short of the threshold, the system automatically restarts.

In the exemplary embodiment, the processing for this method is executed within a mobile device. This is exemplary, and other configurations are also within the scope of the present invention.

Automatic Operations Tracking. Exemplary methods of the present invention may include techniques to aid in tracking and auditing field operations as described below.

Automatic Equipment Determination. For the purpose of automating tracking and auditing, an exemplary method for automatically determining the particular equipment used in an operation is disclosed herein (for non-limiting example, a combine, truck, or trailer). According to this exemplary method, a wireless beacon device is placed on each piece of equipment, a receiver is located at or near the operator, and the system automatically selects from a list of allowed equipment types (for non-limiting example: combines or perhaps trucks) the equipment associated with the beacon of highest signal strength as the equipment used in an operation.

For a non-limiting example, while loading in the field, the combine currently loading the cart can be detected as closest and thus assigned to the transaction. Similarly while unloading, a truck receiving the grain can be detected as the closest truck and thus assigned to the transaction. Combined with the time, location, and event details (for example transactional weight) a detailed audit trail can be provided for field operations.

In another non-limiting example a list of detected equipment could be presented to the user and a selection by the user could be used to determine the equipment used in the operation. Before being presented to the user this list could be further limited to detected equipment where the associated beacon signal strength exceeds a threshold. This may be useful in cases where equipment are in close proximity such as when multiple trucks are waiting to be loaded with grain. In the case where only a single equipment has a beacon signal exceeding the threshold that equipment could be automatically determined as the equipment used in the operation.

The exemplary method uses stand-alone Bluetooth Low Energy (BLE) beacons, such as those currently available from Gelo Inc., mounted to each piece of equipment, and configured to periodically provide its identity. A mobile device mounted in the tractor cab monitors the announcements (e.g. Bluetooth "advertisements") and processes the events in the manner disclosed in order to determine the nearest equipment. Other embodiments could include using an additional mobile device, acting as a beacon, mounted in the cab of the equipment being monitored (the truck or combine cab for non-limiting example). This is exemplary, and other configurations and implementations are also within the scope of the present invention.

Estimation of Combine Fill Level. Another exemplary method is used to estimate the combine's current fill level while harvesting in order to facilitate operations in the field. By tracking the performance of the each combine (load weight per unit time), the method can predict combine fill level using linear extrapolation as follows:

$$\hat{F}(t)=\Sigma F_{LOAD}/\Delta t_{LOAD}*t \quad (5)$$

Where $\hat{F}$ is the estimate of combine fill weight with time (t) since the last load; $\Sigma F_{LOAD}$ is the accumulated weight of the N most recent loads; and $\Delta t_{LOAD}$ is the time between the most recent load and the one preceding the $N^{th}$ last load.

This exemplary method uses a value of one (1) for the window size (N). This exemplary method uses the processor of the mobile device to process weights of loads and the time between such in order that it estimate the combine's current fill level. Other configurations are also within the scope of the present invention. This estimate can be improved by instead using GPS locations services so that the system tracks combine performance per unit of field area harvested instead of per unit time. In this case, combine performance is rated as load weight per area harvested between loads. This method can predict combine fill level using linear extrapolation as follows:

$$\hat{F}(a)=\Sigma F_{LOAD}/\Delta a_{LOAD}*a \quad (6)$$

Where $\hat{F}$ is the estimate of combine fill weight with area harvested (a) since the last load; $\Sigma F_{LOAD}$ is the accumulated weight of the N most recent loads; and $\Delta a_{LOAD}$ is the area harvested between the most recent load and the one preceding the $N^{th}$ last load.

This exemplary method uses a value of one (1) for the window size (N). This exemplary method computes the area harvested as the line-integral of the path traveled, multiplied by the harvester's header width, subtracting that portion of the swath that overlapped previously harvested swaths. The overlap is determined using a high-resolution grid representing the field whereby each harvested grid location gets marked so as to be excluded on subsequent paths. This exemplary method uses a grid size of one foot (1') squared. Other configurations are also within the scope of this invention.

This exemplary method uses the processor of a mobile device in the tractor cab to process weights of loads as measured, along with the combine's current GPS location as measured and forwarded from a mobile device, mounted in the combine cab, over the wireless Internet cellular infrastructure. This is exemplary, and other configurations are also within the scope of the present invention.

Although this method requires that information be shared between a combine and a cart, connectivity need not be continuous as the system can fall back to using time-based prediction during periods when the network is unavailable.

Automatic Weigh Bridge Health Detection. Exemplary embodiments of the present invention may include a technique to electrically test the weigh bars or load cells while installed on the grain cart.

The technique performs operations to test all four resistors that form the standard weighbridge arrangement. The technique will also work where multiple weigh bars or load cells of a cart are wired in parallel (all like terminals wired together), so that the measured value for each weighbridge resistor approximates that of the parallel combination of all like resistors. This makes the measurement less sensitive by a factor of approximately the total number of weigh bars, and so measurement precision must be sufficient to reveal any anomalies.

Figure 8B:
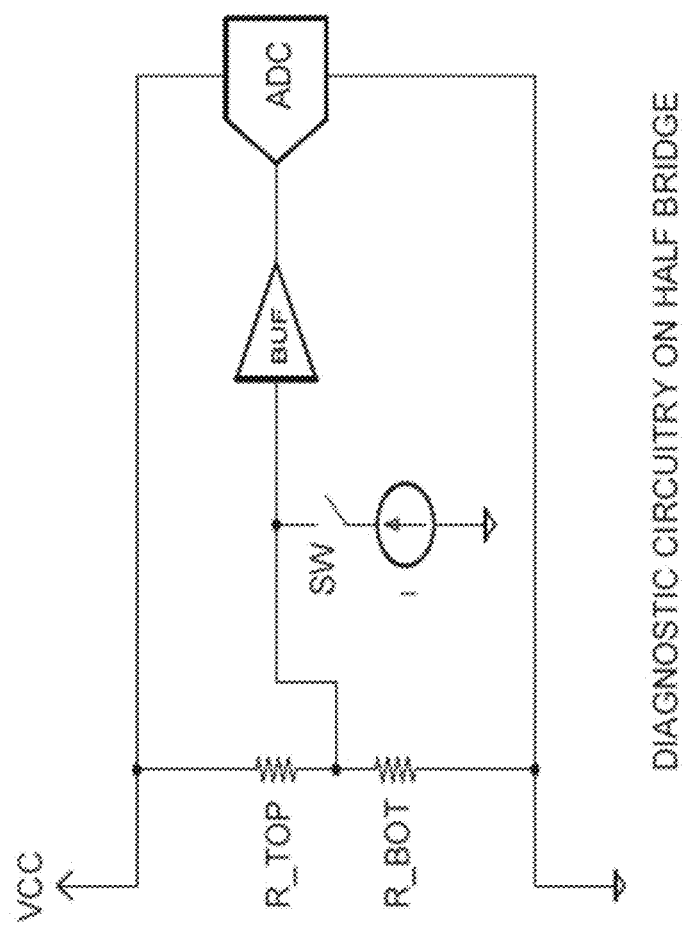
FIG. 8B is a diagram that shows diagnostic circuitry on a half bridge, in accordance with one embodiment of the present invention.
Figure 8A:
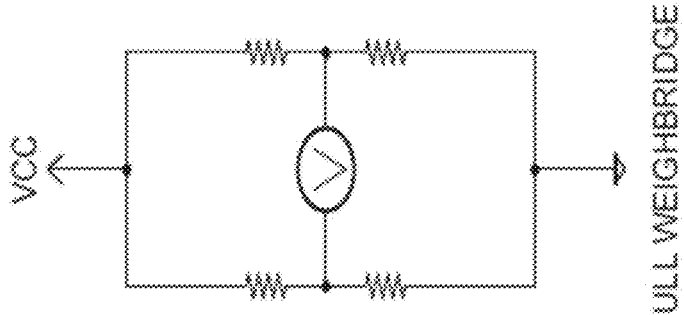
FIG. 8A is a diagram that shows a standard weighbridge.

FIG. 8A is a diagram that shows a standard weighbridge. FIG. 8B is a diagram that shows diagnostic circuitry on a half bridge, in accordance with one embodiment of the present invention. The analysis preferably splits the weighbridge symmetrically into left and right halves (see FIG. 8B). This is possible because the excitation connections are typically low impedance voltage sources (in the exemplary embodiment, positive and ground voltage rails).

In FIG. 8B, the voltmeter (circle with "V") of the full bridge (FIG. 8A) has been decomposed into the buffer (BUF) and analog to digital converter (ADC) of the half bridge.

The analysis solves for the two half bridge resistors by measuring the voltage at the midpoint under various conditions and with different voltage references. The first step measures the ratio of the voltage divider formed by the two resistors while the current source is disabled. This is done using the excitation voltage ($V_{CC}$ and Ground) as the reference for the ADC. The next step uses a fixed voltage reference (often available internal to the ADC) and the ADC to measure the voltage at the midpoint of the half bridge while the current source is disconnected. This step is repeated with the current source connected.

Using network analysis techniques, the value of the top resistor can then be found as follows:

$$R_{TOP}=(V_{MID2}-V_{MID1})/(I*(1-\text{RATIO})) \quad (7)$$

Where $R_{TOP}$ is the resistance of the top resistor; $V_{MID1}$ and $V_{MID2}$ are the voltages measured at the midpoint of the half bridge with the switch open and closed respectively; I is the value of the constant current source; and RATIO is the measured ratio of the midpoint voltage with respect to the excitation voltage, with no current source.

Similarly, the value of the bottom resistor can be found as follows:

$$R_{BOT}=(V_{MID2}-V_{MID1})/(I*(I-\text{RATIO})) \quad (8)$$

Where $V_{MID1}$, $V_{MID2}$, I, and RATIO are defined previously, and $R_{BOT}$ is the resistance of the bottom resistor. In this exemplary embodiment, the processor of the electronics can perform the health measurements as directed by a mobile device in the tractor cab. Other configurations are also within the scope of the present invention.

Exemplary embodiments may also include a method to isolate individual weight sensors that have been combined as would be done through use of a junction box 15 (see FIG. 4), so that health detection can be performed on individual weight sensors in order to provide more thorough diagnostic capability. This embodiment involves replacing the passive junction box for which the like terminals of all weight sensors are permanently joined, with instead an active junction box whereby all connections for each weight sensor can be individually connected to (or disconnected from) the measurement electronics through use of digitally controlled switches, in order to present any possible combination of the weigh bars. In the exemplary embodiment, the measurement electronics control the switches of the active junction box. This is exemplary, and other configurations are also within the scope of the present invention.

This invention provides a number of different alternatives and embodiments. In one embodiment, the invention can be utilized to trouble shoot weight sensors that do not appear to be operating correctly. Pairs of resisters in the half bridges are serially tested, with note being taken whenever the results of the testing are problematic. In another embodiment, the weight sensors are tested on a routine or somewhat routine basis. For example, they may be tested on a periodic basis, or may be tested daily whenever the system is started. Other alternatives are also within the scope of the invention. A controller may send an alert when problems are discovered, or flags or codes set indicating problems. This allows weight sensors to be repaired or replaced before they fail or are inaccurate enough to affect operations. Other configurations and alternate usages are also within the scope of the present invention.

Enhanced Display Location Diversity. Exemplary embodiments of the present invention may include a method to increase the diversity of display locations while in operation. A display is located for convenient viewing in one of the two grain transfer phases (loading or unloading). During the other phase, the operator views the display through a mirror positioned at an angle that is convenient for viewing during that phase; the mirror reflects an image that is deliberately reversed by the display equipment so that it becomes restored through reflection. Control of the reversing process could be applied automatically to reduce the burden on the equipment operator. For non-limiting example, reversing control could be linked to the automatic transaction detection method whereby the display is automatically reversed while unloading. In this case, the display would be mounted for convenient viewing during loading (combine to cart), and the mirror used while unloading (cart to truck). The opposite scenario would also be possible, whereby the mounting locations and reversing control are each reversed. Other configurations are also within the scope of the present invention.

Figure 9A:
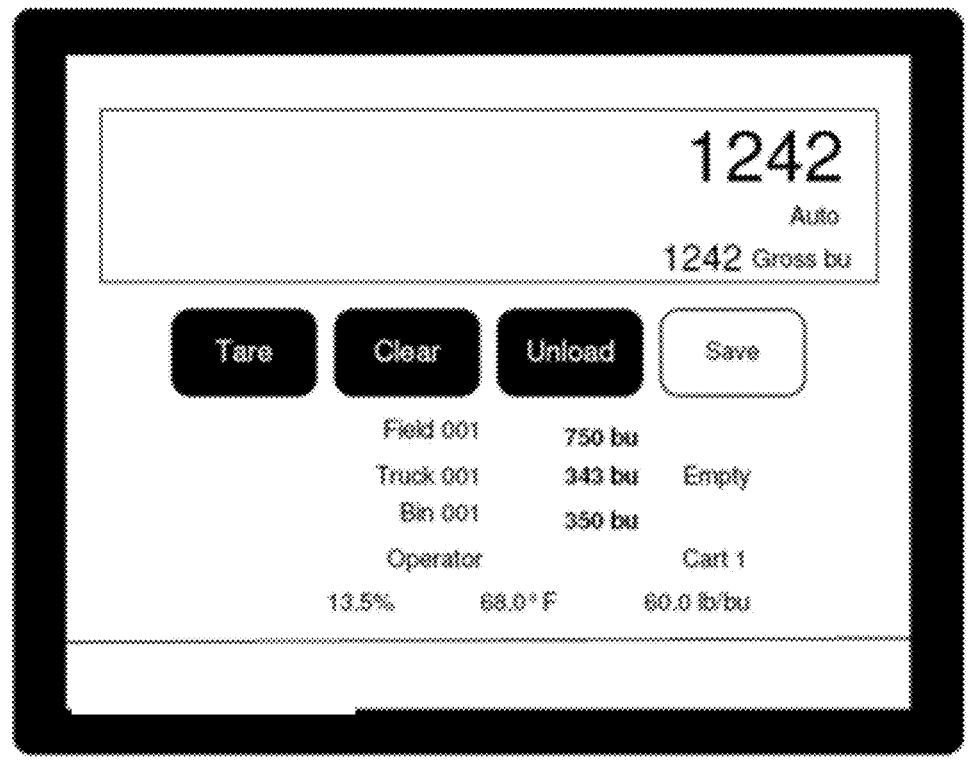
FIGS. 9A and 9B are drawings that illustrate a tablet showing loading/unloading information.
Figure 9B:
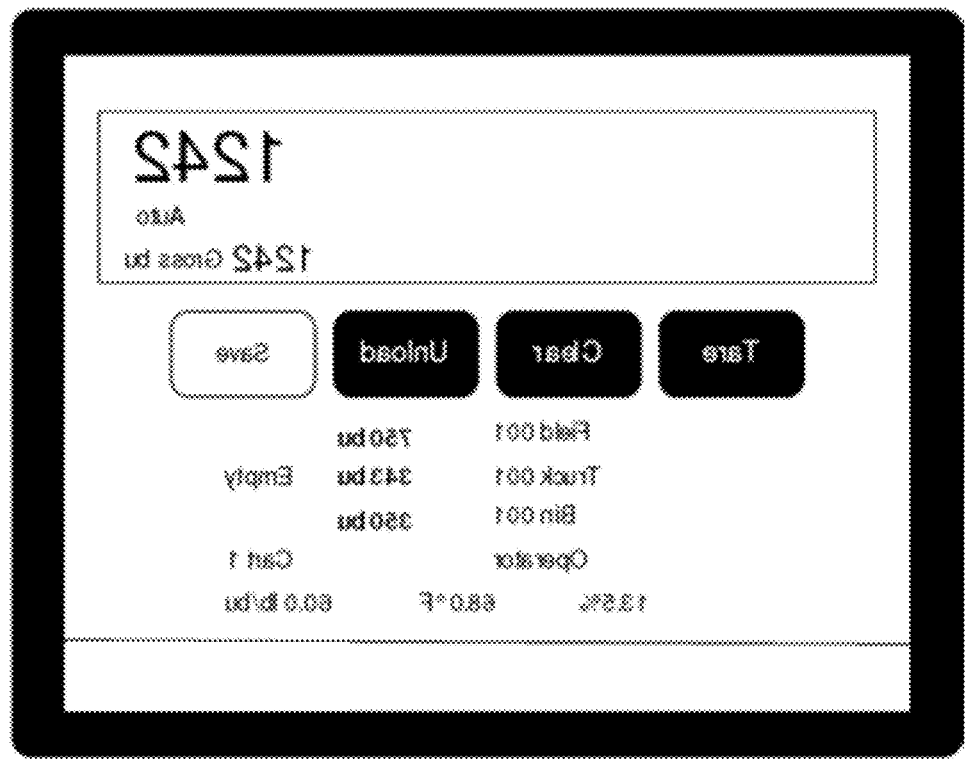

FIG. 9A is a drawing that illustrates a tablet showing loading/unloading information. FIG. 9B is a drawing showing the same tablet shown in FIG. 9B, but reversed. The information shown in these displays is exemplary, and the display of other information and other configurations of the display are also within the scope of the present invention.

A user selectable element (not shown) such as a button or checkbox could be present in the user interface allowing the user to manually choose between the regular and reversed display. This may be useful for testing purposes, in the case the automatic detection fails to work, or simple user preference.

The device could also be configurable to disable one or more of the display reverse methods. For example, a user may desire to disable the automatic reverse because it is not useful in their work scenario. In another example, a user may desire to disable the user-selectable element because the automatic reverse meets their needs and they want more room on the display. This configurability could be present via an options or configuration menu in the user interface. Other configurations and options are also within the scope of the present invention.

The present invention is targeted at grain cart applications, but is equally applicable for use with other equipment, such as combines, trucks, planters, air seeders, and seed tenders. These types of equipment are exemplary, and other types are also within the scope of the present invention. In all cases, the invention can improve weighing performance, data quality, sensor diagnostics, and automates and enhances field operations.

Those skilled in the art will recognize that modifications and variations can be made without departing from the spirit of the invention. Therefore, it is intended that this invention encompass all such variations and modifications as fall within the scope of the appended claims.

The invention claimed is:

1. A system for performing diagnostics on a weight sensor installed on farm equipment and comprising at least a top resistor and a bottom resistor coupled together at a midpoint, the system comprising:
a switch coupled between a current source and the midpoint; and
a voltmeter comprising at least an analog to digital converter, the voltmeter coupled with the midpoint; and
a controller configured to measure a plurality of voltages at the midpoint by connecting and disconnecting the switch and determine, based on the plurality of measured voltages and a value of the current source, a first value for the top resistor and a second value for the bottom resistor.

2. The system of claim 1, wherein the controller is further configured to generate and transmit a message comprising at least one of the determined first value or determined second value.

3. The system of claim 2, wherein the message is used to identify when the weight sensor is not operating correctly.

4. The system of claim 1, wherein the controller is configured to at least measure a ratio of the top resistor and the bottom resistor while the current source is disconnected using an excitation voltage as a reference for the analog to digital converter.

5. The system of claim 4, wherein the first value of the top resistor is determined as follows:

$$R\_TOP = (VMID2 - VMID1)/(I * RATIO)$$

wherein R_TOP is a resistance of the top resistor; VMID1 and VMID2 are voltages measured at the midpoint with the switch open and closed respectively; I is the value of the current source; and RATIO is the measured ratio with respect to the excitation voltage.

6. The system of claim 4, wherein the second value of the bottom resistor is determined as follows:

$$R\_BOT = (VMID2 - VMID1)/(I * (1 - RATIO))$$

wherein RBOT is a resistance of the bottom resistor; VMID1 and VMID2 are voltages measured at the midpoint with the switch open and closed respectively; I is the value of the current source; and RATIO is the measured ratio with respect to the excitation voltage.

7. The system of claim 1, wherein the controller is further configured to determine a resistance while the current source is connected using a fixed voltage as a reference for the analog to digital converter.

8. The system of claim 1, further comprising an active junction box that is configured to connect or disconnect connections for each weight sensor of a plurality of weight sensors including at least the weight sensor to or from measurement electronics.

9. The system of claim 1, wherein the controller is configured to measure the plurality of voltages each time the system is started.

10. A method for electrically testing a weight sensor installed on farm equipment using a diagnostic circuit, the weight sensor comprising a top resistor and a bottom resistor coupled at a midpoint, the diagnostic circuit comprising a current source, a switch, and an analog to digital converter, the switch coupled to the current source, the midpoint, and the analog to digital converter, the method comprising:
measuring, by a processor, a ratio of the top resistor and the bottom resistor while the switch is open;
measuring, by the processor, a first voltage at the midpoint while the switch is open;
measuring, by the processor, a second voltage at the midpoint while the switch is closed; and
calculating, by the processor, values of resistance for the top resistor and the bottom resistor based at least on the first voltage, the second voltage, the ratio, and a value of the current source.

11. The method of claim 10, further comprising:
generating, by the processor, an alert when the values of resistance are abnormal.

12. The method of claim 10, further comprising determining, by the processor, a resistance while the current source is connected using a fixed voltage as a reference for the analog to digital converter.

13. The method of claim 10, wherein a value of a resistance of the top resistor is determined as follows:

$$R\_TOP=(VMID2-VMID1)/(I*RATIO)$$

wherein R_TOP is the value of a resistance of the top resistor; VMID1 and VMID2 are voltages measured at the midpoint with the current source disabled and enabled respectively; I is the value of the current source; and RATIO is the measured ratio.

14. The method of claim 10, wherein a value of a resistance of the bottom resistor is determined as follows:

$$R\_BOT=(VMID2-VMID1)/(I*(1-RATIO))$$

wherein RBOT is the value of resistance of the bottom resistor; VMID1 and VMID2 are voltages measured at the midpoint with the current source disabled and enabled respectively; I is the value of the current source; and RATIO is the measured ratio.

15. The method of claim 10, wherein the weight sensor is electrically tested daily whenever the weight sensor is started.

16. A method for performing diagnostics on one or more weight sensors installed on farm equipment, the method comprising:
isolating each of the one or more weight sensors using an active junction box wherein connections for each of the one or more weight sensors are individually connected to or disconnected from measurement electronics;
measuring voltages for a specific weight sensor of the one or more weight sensors under different conditions and with different voltage references;
determining based at least on the measured voltages and a value for a current source, resistance values for resistors in the specific weight sensor; and
transmitting the resistance values to a mobile device.

17. The method of claim 16, wherein the specific weight sensor comprises a plurality of half bridges each comprising two resistors.

18. The method of claim 17, wherein each half bridge comprises a top resistor and a bottom resistor coupled at a midpoint to a diagnostic circuit, diagnostic circuit comprising the current source, a switch, and an analog to digital converter, the switch coupled to the current source, the midpoint, and the analog to digital converter, wherein measuring voltages comprises:
measuring a ratio of the top resistor and bottom resistor using an excitation voltage as a reference for the analog to digital converter;
measuring a first voltage at the midpoint while the current source is disconnected; and
measuring a second voltage at the midpoint while the current source is connected.

19. The method of claim 18, wherein determining the resistance values for the top resistor and the bottom resistor is based at least on the first voltage, the second voltage, the ratio, and a value of the current source.

20. The method of claim 16, further comprising:
generating an alert when the resistance values are abnormal; and
displaying the alert on the mobile device.

* * * * *